C. E. EVANS.
GARDEN SEED PLANTER.
APPLICATION FILED OCT. 3, 1918.
1,294,641.
Patented Feb. 18, 1919.
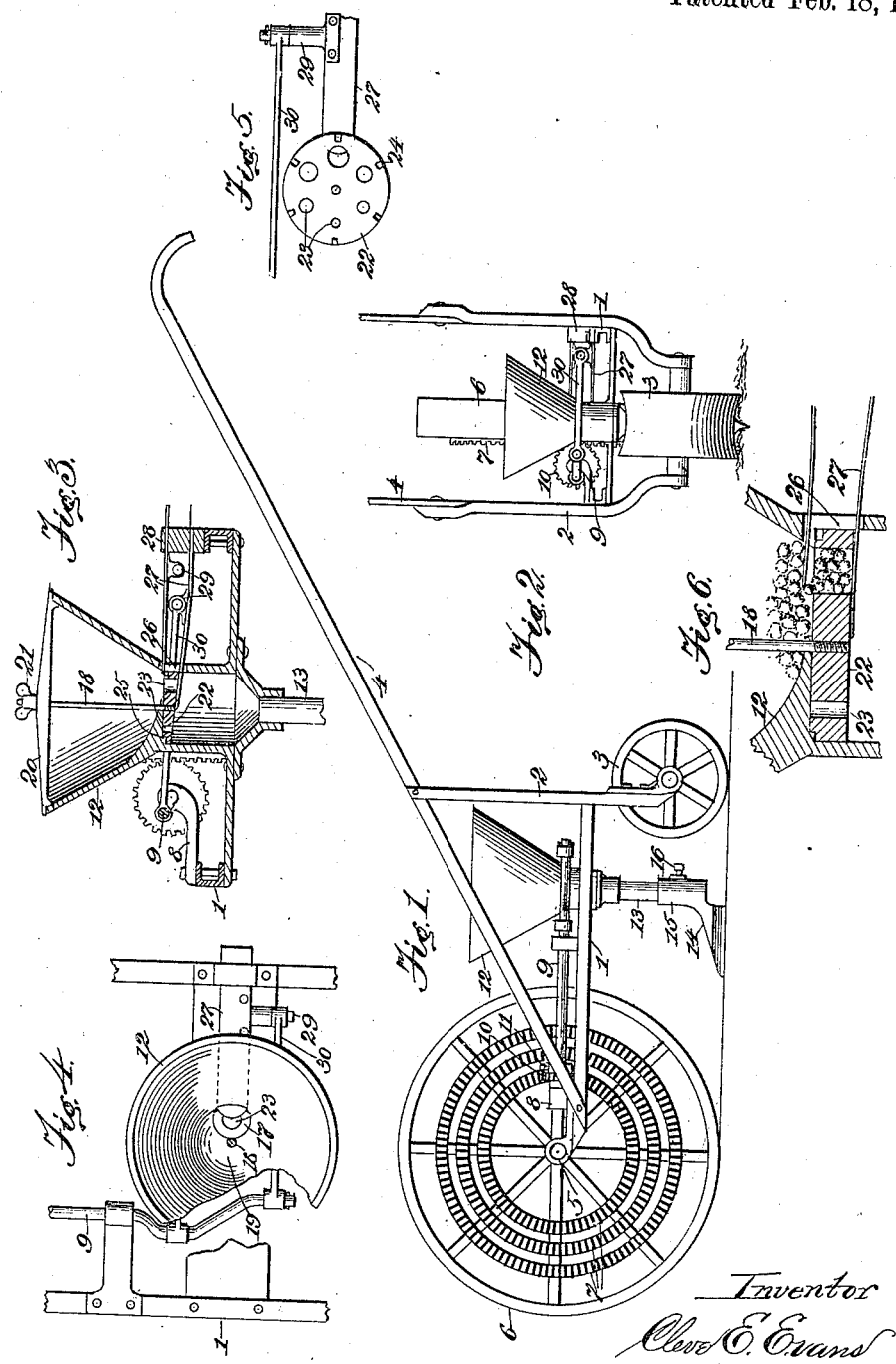

UNITED STATES PATENT OFFICE.

CLEVE E. EVANS, OF NEAR CEDAR RAPIDS, IOWA, ASSIGNOR OF ONE-HALF TO GEO. T. HEDGES, OF CEDAR RAPIDS, IOWA.

GARDEN-SEED PLANTER.

1,294,641.             Specification of Letters Patent.     Patented Feb. 18, 1919.

Application filed October 3, 1918. Serial No. 256,669.

*To all whom it may concern:*

Be it known that I, CLEVE E. EVANS, a citizen of the United States, residing near Cedar Rapids, in the county of Linn and State of Iowa, have invented certain new and useful Improvements in Garden-Seed Planters; and I do hereby declare the following to be a full, clear, and exact description of the invention, such as will enable others skilled in the art to which it appertains to make and use the same.

This invention relates to planters, more particularly those used for the planting of garden seeds; and the object of the invention is to improve these planters, especially the seed-dropping mechanism thereof, so as to secure a regular and even distribution of seed, with means for regulating the supply according to the character of the seed, or other requirements.

The nature of the invention is fully disclosed in the description and claims following, reference being had to the accompanying drawing, in which:—

Figure 1 is a side elevation of a planter embodying my improvements. Fig. 2 is a partial elevation of the same as seen from the rear. Fig. 3 is a vertical, transverse section of the seed-hopper and dropping mechanism, central to the hopper. Fig. 4 is a fragmentary plan view of the same. Fig. 5 is a plan view of the seed-disk and the lower cut-off and its connecting rod. Fig. 6 is a sectional view illustrating the action of the cut-off when obstructed by a seed.

In the drawing the numeral 1 denotes the sills of the main frame; 2 a pair of standards connecting therewith, and bearing at their lower ends the covering-wheel 3. To these standards and the sills connect the handles 4, by which the planter is operated manually. In bearings 5 at the front end of the main frame is mounted the drive-wheel 6, which at one side is provided with one or more gears 7. In bearings 8 is mounted a crank-shaft 9 carrying a pinion 10 meshing with said gear or gears. In practice a plurality of such gears is provided, varying in diameter, as shown, so that the speed of revolution of the crank-shaft may be varied according to requirements, the pinion being shifted along the crank-shaft and fixed in mesh with any desired gear by means of a set-screw 11. In order that this may be done easily and without the shifting of other parts, the gears are not made as bevel-gears, the pinion being a simple spur gear and the others crown gears, and all in the same plane, so that the pinion may be slid readily from one to another. This would of course cause faulty action of the gears if the tooth-faces were long, but the service required of the gears is so light that the teeth of one, or both, may be short, and so the meshing of the gears is practically satisfactory.

On the frame, between the drive-wheel and the covering wheel, is mounted the seed-hopper 12, from which depends a tubular shank 13 carrying the shoe or furrow-former 14 at its lower end. The shoe has a tubular shank 15 fitting the seed-tube 13, and is adjustable up or down thereon, according to the depth of furrow desired, and is fastened by means of a set-screw 16.

In Fig. 4 it will be seen that the hopper is herein provided with a seed-outlet 17 at one side of its center, this outlet being large enough for maximum service. In the center of the hopper is a rod 18, passing through a hole in the hopper diaphragm 19. The upper portion of the rod passes through a bridge bar 20, and is provided with a thumb-screw 21. To the lower end of the rod is attached the seed-disk 22, which is pierced with a number of holes 23 of varying diameter. The holes are made to register with the seed-outlet of the hopper by means of recesses 24 in the seed-disk, and a corresponding nib 25 formed on the hopper diaphragm. The shift of the seed-disk is made quickly and accurately, by loosening the thumb-screw, turning the disk, as may be done by the suspending rod, and then tightening it in place.

In the side of the hopper throat, adjacent to the seed-disk, is an opening 26 to receive a pair of blades 27, whose outer ends run in guides 28 attached to one side of the frame. To the blades are attached wrist-pins 29, with connections less than half the width of the blades, so that the wrists may pass each other. The wrists connect by rods 30 with oppositely disposed cranks, as best shown in Fig. 4. The revolution of the crank-shaft thus imparts reciprocating motion to the blades, one of which plays above the seed-disk and the other directly below it, and across the hole in the disk coinciding with the seed-outlet of the hopper.

The disk may be a simple one, with parallel faces, as shown in Fig. 6, or a tapered one, as shown in Fig. 3, the purpose of the taper being to vary the depth of the holes in the disk, and thus secure increased variation in the capacities of the seed-holes. This is made possible by the fact that the cut-off blades are made very thin and flexible, preferably of spring steel, and are made to hug the disk snugly in operation. This causes the blade on the incline side of the disk to lie approximately flat thereon, in any of its positions, and so prevent the escape of seeds, except at the proper time. The flexibility of the blades also permits the upper one to bend, as shown in Fig. 6, in case a hard seed happens to be caught by its end, and so pass by without crushing the seed, the effect of which would be to more or less clog the seed-hole.

As shown in Fig. 6 the blades are at midstroke, the dotted line indicating full stroke of the lower blade. The seed-hole is thus always covered, either at the bottom or the top, so there can be no leakage of seeds past the blades, and only the proper amount of seed flows through it. The movement of the upper blades also causes an agitation of the seed in the hopper, and in its outstroke tends to carry the superimposed seed to position to fall into the seed-holes, and thus secure regular measurement of the seed. In practice the planter has been found to give a very uniform distribution of seed, with none of the stoppages and excessive discharges incident to other planters.

Having thus described my invention, I claim:

1. In a seed-planter, the combination with actuating mechanism, of a seed-hopper, a perforated seed-disk at the bottom thereof, and a pair of thin, flexible, alternately reciprocating blades in contact with the seed-disk above and below, respectively.

2. In a seed-planter, the combination with actuating mechanism, of a seed-hopper, a perforated seed-disk at the bottom thereof, a pair of thin, flexible blades mounted respectively above and below said disk, and guides for said blades.

3. In a seed-planter, the combination with actuating mechanism, of a seed-hopper with a seed-outlet at the bottom, a seed-disk perforated with various sized holes, coinciding, as adjusted, with the seed outlet, and attached rod and fastening means, and a pair of blades mounted to slide alternately above and below said disk, respectively.

4. In a seed-planter, the combination with actuating mechanism, of a seed-hopper with a bottom outlet, a tapered rotatably adjustable seed-disk attached to said bottom, and a pair of thin, flexible, alternately reciprocating blades pressing elastically against the top and bottom of said disk, respectively, and in their movement intercepting the flow of seed through said outlet.

In testimony whereof I affix my signature in presence of two witnesses.

CLEVE E. EVANS.

Witnesses:
A. T. COOPER,
J. M. ST. JOHN.

Copies of this patent may be obtained for five cents each, by addressing the "Commissioner of Patents, Washington, D. C."